United States Patent
Schornstein et al.

(10) Patent No.: US 12,325,160 B2
(45) Date of Patent: Jun. 10, 2025

(54) COMPOSITE ELEMENTS MADE FROM THERMOPLASTIC MATERIALS AND POLYURETHANES, METHOD FOR PRODUCING SAME, AND USE THEREOF

(71) Applicant: Covestro Deutschland AG, Leverkusen (DE)

(72) Inventors: Marcel Schornstein, Neuss (DE); Timo Lars Reitemeyer, Troisdorf (DE)

(73) Assignee: Covestro Deutschland AG, Leverkusen (DE)

( * ) Notice: Subject to any disclaimer, the term of this patent is extended or adjusted under 35 U.S.C. 154(b) by 161 days.

(21) Appl. No.: 17/914,901

(22) PCT Filed: Mar. 30, 2021

(86) PCT No.: PCT/EP2021/058339
§ 371 (c)(1),
(2) Date: Sep. 27, 2022

(87) PCT Pub. No.: WO2021/204603
PCT Pub. Date: Oct. 14, 2021

(65) Prior Publication Data
US 2023/0140887 A1 May 11, 2023

(30) Foreign Application Priority Data
Apr. 6, 2020 (EP) .................... 20168334

(51) Int. Cl.
*B29C 44/02* (2006.01)
*B29C 44/06* (2006.01)
*B29K 75/00* (2006.01)
*B29K 101/12* (2006.01)

(52) U.S. Cl.
CPC ............ *B29C 44/025* (2013.01); *B29C 44/06* (2013.01); *B29K 2075/00* (2013.01); *B29K 2101/12* (2013.01)

(58) Field of Classification Search
CPC ..................................... B29C 44/025
See application file for complete search history.

(56) References Cited

U.S. PATENT DOCUMENTS

| | | |
|---|---|---|
| 9,751,279 B2 | 9/2017 | Albach et al. |
| 2007/0098997 A1 | 5/2007 | Younes et al. |
| 2011/0250429 A1 | 10/2011 | Renner et al. |
| 2012/0225278 A1 | 9/2012 | Van de Braak et al. |
| 2014/0199540 A1* | 7/2014 | Albach .............. C08G 18/4018 428/319.7 |
| 2015/0259496 A1 | 9/2015 | Albers et al. |
| 2017/0190080 A1* | 7/2017 | Rischko .............. C08G 18/482 |

FOREIGN PATENT DOCUMENTS

| | | |
|---|---|---|
| DE | 19928608 A1 | 12/2000 |
| DE | 10022276 A1 | 11/2001 |
| DE | 10022280 A1 | 11/2001 |

OTHER PUBLICATIONS

International Search Report, PCT/EP/2021/058339, date of mailing: Jun. 17, 2021, Authorized officer: Florian Paulus.

* cited by examiner

*Primary Examiner* — Virak Nguon
(74) *Attorney, Agent, or Firm* — Donald R. Palladino

(57) ABSTRACT

The invention relates to: composite elements comprising a thermoplastic material and a polyurethane adhering to said thermoplastic material; a method for producing same; and the use thereof.

12 Claims, No Drawings

COMPOSITE ELEMENTS MADE FROM THERMOPLASTIC MATERIALS AND POLYURETHANES, METHOD FOR PRODUCING SAME, AND USE THEREOF

CROSS-REFERENCE TO RELATED APPLICATION

This application is a national stage application under 35 U.S.C. § 371 of PCT/EP2021/058339, filed Mar. 30, 2021, which claims the benefit of European Application No. 20168334.9, filed Apr. 6, 2020, each of which is incorporated herein by reference.

FIELD

The invention relates to composite elements comprising a thermoplastic and a polyurethane adjoining the latter in adhering fashion, processes for the production thereof and use thereof.

BACKGROUND

Polyisocyanate polyaddition products obtainable by reaction of polyisocyanates with isocyanate-reactive compounds as well as composite elements of these products with further plastics are common knowledge. Subjecting these composite elements to mechanical loading often leads to undesirable detachment of the plastics from the polyisocyanate polyaddition products. Particularly when the composite elements used in automotive construction are elements for which such loading cannot be ruled out, detachment of the polyisocyanate polyaddition products from the further plastics and hence destruction of the composite element is not acceptable.

Furthermore, efforts are made in particular in the automotive industry to use components that are as light as possible, in order to save resources both in the production and in the driving of automobiles, and thus to be able to achieve environmental and economic advantages.

WO 2010/072572 discloses composite elements made from plastic which are adjoined in adhering fashion by a polyisocyanate polyaddition product (PUR), the PUR formulation comprising a polyester polyalcohol functioning as adhesion promoter. The polyester polyalcohol can be produced by polycondensation of an acid component and one or more diols, the acid component consisting of from 83 to 97 mol % of adipic acid and 3 to 17 mol % of phthalic acid, isophthalic acid and/or terephthalic acid. Only general statements are made with respect to further isocyanate-reactive components that are not necessarily required for the production of the polyurethane, without discussing any specific features.

DE 100 22 280 A1 and DE 100 22 276 A1 disclose that the production of a polyurethane uses isocyanate prepolymers, obtainable from the reaction of an isocyanate and a polyester polyalcohol which must have functionalities of 2 to 3 and OH numbers of 40 to 400 mg KOH/g, with adipic acid and/or phthalic anhydride as well as diols and/or triols being used as starting components. Only general statements are made with respect to the isocyanate-reactive component that is required for the production of the polyurethane, without discussing any specific features.

DE 199 28 608 A1 discloses composite elements made from plastic which are adjoined in adhering fashion by a polyisocyanate polyaddition product (PUR), the PUR formulation comprising a polyester polyalcohol of functionality 2-3. The latter is based on a polycondensation product of adipic acid and/or phthalic anhydride as well as polytetrahydrofuran (PTHF), 1,6-hexanediol, 1,4-butanediol, monoethylene glycol, diethylene glycol (DEG), trimethylolpropane (TMP) and/or neopentyl glycol. Only general statements are made with respect to further isocyanate-reactive components, without discussing any specific features.

WO 2013/017510 A1 discloses composite elements made of thermoplastic which are adjoined in adhering fashion by a polyisocyanate polyaddition product (PUR), the PUR formulation comprising a polyester polyol having an ester group concentration of 9 to 10 mol/kg of ester as well as polyether polyols having molecular weights of less than 5000 g/mol.

WO 2015/185448 A1 discloses composite elements made of at least one cover layer and polyurethane foam as well as a process for the production thereof, the polyether polyols used having a low molecular weight and the polyester polyol being produced not on the basis of 1,2-propanediol.

DETAILED DESCRIPTION

It was thus an object of the invention to provide composite elements that, on account of their excellent mechanical properties, can be used for example in automotive construction, and in the case of which the adhesion between the plastic and the polyisocyanate polyaddition products adhering thereto is not lost even in the case of mechanical loading.

It has surprisingly been found that the aforementioned object was able to be achieved by the composite elements according to the invention.

The invention provides a composite element comprising
A. a thermoplastic adjoined in adhering fashion by
B. a product of the reaction of a reaction mixture comprising
 i. an isocyanate component, comprising one or more polyisocyanates,
 ii. an isocyanate-reactive component comprising
  ii.1) a first polyether polyol having a molecular weight of at least 6000 g/mol, obtainable from the reaction of a starter molecule or a mixture of starter molecules having an OH functionality of 1.8-3.5 with ethylene oxide and propylene oxide, wherein the proportion of ethylene oxide, based on the total amount of ethylene oxide and propylene oxide, in the first polyether polyol is 10-28% by weight,
  ii.2) one or more polyester polyols having a functionality of greater than 2, and a hydroxyl number of 60-150 mg KOH/g, based on the condensation of adipic acid with 1,2-propylene glycol and at least one further compound having at least two hydroxyl groups,
  ii.3) 1,4-butanediol,
  ii.4) diethylenetoluenediamine,
  ii.5) optionally further polyether polyols,
  ii.6) optionally chain extenders and/or crosslinking agents,
  ii.7) optionally catalysts,
  ii.8) optionally blowing agents,
  ii.9) optionally auxiliaries and/or additives.

The composite element according to the invention thus comprises at least one thermoplastic and a reaction product adhering to said plastic, said reaction product being obtainable from the reaction of a reaction mixture comprising an isocyanate component, comprising one or more polyisocyanates, and an isocyanate-reactive component comprising at least four constituents, namely, in addition to 1,4-butanediol and diethylenetoluenediamine, a first polyether polyol having a molecular weight of at least 6000 g/mol, obtainable from the reaction of a starter molecule or a mixture of starter molecules having an OH functionality of 1.8-3.5 with ethylene oxide and propylene oxide, wherein the proportion of ethylene oxide, based on the total amount of ethylene oxide and propylene oxide, is 10-28% by weight, and one or more polyester polyols having a functionality of greater than 2, and a hydroxyl number of 60-150 mg KOH/g, based on the condensation of adipic acid with 1,2-propylene glycol and at least one further compound having at least two hydroxyl groups. In addition, the reaction mixture may comprise, for example, further polyether polyols, chain extenders and/or crosslinking agents, catalysts, blowing agents or auxiliaries and/or additives.

Preferably, the isocyanate-reactive component ii. comprises 50-90% by weight of the first polyether polyol ii.1), based on the total amount of the isocyanate-reactive component ii.

Further preferably, the isocyanate-reactive component ii. comprises 0.1-10% by weight of the polyester polyol(s) ii.2), optionally the proportion of the first polyether polyol ii.1) being 50-90% by weight, in each case based on the total amount of the isocyanate-reactive component ii.

Further preferably, the isocyanate-reactive component ii. comprises 0.1-2.0% by weight of butanediol ii.3), optionally the proportion of the first polyether polyol ii.1) being 50-90% by weight and/or the proportion of the polyester polyol(s) ii.2) being 0.1-10% by weight, in each case based on the total amount of the isocyanate-reactive component ii.

Further preferably, the isocyanate-reactive component ii. comprises 0.01-2.0% by weight of diethylenetoluenediamine ii.4), optionally the proportion of the first polyether polyol ii.1) being 50-90% by weight, the proportion of the polyester polyol(s) ii.2) being 0.1-10% by weight and/or the proportion of butanediol ii.3) being 0.1-2% by weight, in each case based on the total amount of the isocyanate-reactive component ii.

Preference is therefore given to an isocyanate-reactive component ii., wherein the proportion of ii.1) is 50-90% by weight and/or the proportion of ii.2) is 0.1-10% by weight and/or the proportion of ii.3) is 0.1-2.0% by weight and/or the proportion of ii.4) is 0.01-2.0% by weight, in each case based on the total amount of isocyanate-reactive component ii.

In one embodiment, the isocyanate-reactive component according to the invention consists of components ii.1), ii.2), ii.3) and ii.4) and optionally ii.5), ii.6), ii.7), ii.8) and/or ii.9).

In a further embodiment, the product of the reaction of the reaction mixture has a density of 155 kg/m$^3$ or less or 100 to 155 kg/m$^3$, preferably of 140 kg/m$^3$ or less or 100 to 140 kg/m$^3$, even more preferably of 130 kg/m$^3$ or less, in particular 100 to 130 kg/m$^3$.

In a preferred embodiment, the first polyether polyol ii.1) has a molecular weight of 6000-10 000 g/mol, more preferably 6000-8000 g/mol, even more preferably 6000-7000 g/mol, most preferably 6000-6500 g/mol, in particular 6100-6300 g/mol.

In a further embodiment, for the first polyether polyol ii.1), the proportion of ethylene oxide, based on the total amount of ethylene oxide and propylene oxide, is 15-25% by weight, in particular 18-23% by weight, in each case in the first polyether polyol ii.1).

Further preference is given to composite elements in which, for the first polyether polyol ii.1), the starter molecule—if there is one single starter molecule—is selected from the group consisting of ethylene glycol, 1,2- and 1,3-propylene glycol, 1,4-butanediol, 4,4'-dihydroxydiphenylpropane, glycerol, trimethylolpropane, erythritol, sorbitol, ammonia, ethylene diamine, aniline, ethanolamine and triethanolamine, or—if there is a mixture of starter molecules—said mixture consists of components that are selected from the group consisting of the compounds mentioned. Particularly advantageous are such composite elements in which the starter molecule for the first polyether polyol ii.1) is glycerol, or the mixture of starter molecules comprises glycerol.

The isocyanate-reactive component has a polyester polyol ii.2) that is based on the condensation of adipic acid with 1,2-propylene glycol and at least one further compound having at least two hydroxyl groups. In a preferred embodiment, the at least one further compound having at least two hydroxyl groups is selected from the group consisting of ethylene glycol, 1,3-propylene glycol, 1,4-butanediol, 1,5-pentanediol, 1,6-hexanediol and trimethylolpropane, as well as mixtures thereof, particularly preferably a mixture of trimethylolpropane and 1,6-hexanediol.

The composite elements according to the invention may comprise, as thermoplastic A., one or more of the customary thermoplastics, for example acrylonitrile-butadiene-styrene (ABS), polymethyl methacrylate (PMMA), acrylonitrile-styrene-acrylate (ASA), styrene-acrylonitrile (SAN), polycarbonate (PC), thermoplastic polyurethane (TPU), polyvinyl chloride (PVC), thermoplastic polyolefins (TPO) (optionally post-crosslinked), such as polyethylene and polypropylene, styrene-maleic anhydride copolymer (SMA) and blends, i.e. mixtures, thereof. The composite elements preferably comprise thermoplastic PVC, particularly preferably PVC film, as thermoplastic A.

The thermoplastics A. for producing the composite elements may be used in customary form, for example as films, preferably with a layer thickness of 0.2 to 2 mm Such films are commercially available, and the production thereof is common knowledge.

If required, the composite elements may additionally have, on the side facing away from the thermoplastic A., a backing made of thermosets or thermoplastics, or a self-supporting injection molding, for example made of fiber-reinforced thermoplastics or thermosets. In industrial practice, preference is given to using backing materials made of polyurethane, polycarbonate/acrylonitrile-butadiene-styrene copolymers, polypropylene and acrylonitrile-butadiene-styrene; these materials may optionally be fiber-reinforced, in particular glass fiber-reinforced.

According to the invention, the thermoplastic A. is adjoined in adhering fashion by the polyisocyanate polyaddition products B., for example polyurethanes that may optionally have isocyanurate structures and/or urea structures. These polyisocyanate polyaddition products B., preferably the polyurethanes, that may be present in compact or preferably cellular form, particularly preferably open-cell form, for example as flexible foam, semi-rigid foam or rigid foam, particularly preferably as semi-rigid foam, are produced by reacting the corresponding components of the reaction mixture according to the invention in the presence of the plastic A.

Preference is given in particular to such composite elements in which the adhesion between the thermoplastic A. and the product of the reaction of the reaction mixture B. is at least 26 N/50 mm, preferably at least 27 N/50 mm, more preferably at least 29 N/50 mm, measured in accordance with DIN 53 357 A as disclosed in the Examples section.

The invention further provides a process for producing the composite elements according to the invention. This process comprises the steps of I. providing the thermoplastic A., the isocyanate component i. and the isocyanate-reactive component ii., II. mixing the isocyanate component i. and isocyanate-reactive component ii. provided in step I. in order to obtain the reaction mixture, III. bringing the reaction mixture obtained in step II. into contact with the thermoplastic A. provided in step I. so that the reaction mixture is in contact with the thermoplastic A, IV. foaming the reaction mixture obtained in step II. while it is in contact with the thermoplastic, in order to obtain a composite element comprising the thermoplastic A. adjoined in adhering fashion by the product B. of the reaction of the reaction mixture, V. demolding the composite element obtained in step IV.

The invention also provides the use of the composite elements according to the invention in components in vehicle and aircraft construction as well as in the construction industry, for example in dashboards, door linings, parcel shelves, consoles, armrests, car seats, backrests, headrests, roof liners or door mirrors.

Lastly, the invention likewise provides components in vehicle or aircraft construction or in the construction industry that comprise the composite elements according to the invention, for example dashboards, door linings, parcel shelves, consoles, armrests, car seats, backrests, headrests, roof liners or door mirrors.

Polyether polyols are generally polyhydroxy polyethers which can be produced in a manner known per se by polyaddition of alkylene oxides onto polyfunctional starter compounds in the presence of catalysts. The polyether polyols can be produced for example from a starter compound or a starter compound mixture having on average 2 to 6 active hydrogen atoms and one or more alkylene oxides. Customary starter compounds are molecules having 2 to 8, in particular 3 to 8 or 3 to 6, hydroxyl groups per molecule, such as triethanolamine, glycerol, trimethylolpropane, pentaerythritol, sorbitol and sucrose. The starter compounds may be used alone or in a mixture, including with difunctional starter compounds such as diethylene glycol, dipropylene glycol, triethylene glycol, tripropylene glycol, 1,4-butanediol and 1,6-hexanediol. The production of polyether polyols may involve the use of one or more alkylene oxide(s), for example ethylene oxide, propylene oxide and butylene oxide. They may be used alone or in a mixture. When used in a mixture, it is possible to react the alkylene oxides in random or blockwise fashion, or both in succession.

The first polyether polyol ii.1) according to the invention has a molecular weight of at least 6000 g/mol and is obtainable from the reaction of a starter molecule or a mixture of starter molecules having an OH functionality of 1.8-3.5 with ethylene oxide and propylene oxide, wherein the proportion of ethylene oxide, based on the total amount of ethylene oxide and propylene oxide, in the first polyether polyol ii.1) is 10-28% by weight, preferably 15-25% by weight, more preferably 18-23% by weight. In this case, the production of the first polyether polyol ii.1) may involve the use of a mixture of ethylene oxide and propylene oxide, or the use of both alkylene oxides in succession.

Preference is given to first using propylene oxide, before using ethylene oxide. In a preferred embodiment, the starter molecule or—if a mixture of starter molecules is used—one of the starter molecules is one selected from the group consisting of ethylene glycol, 1,2- and 1,3-propylene glycol, 1,4-butanediol, 4,4'-dihydroxydiphenylpropane, glycerol, trimethylolpropane, erythritol, sorbitol, ammonia, ethylene diamine, aniline, ethanolamine and triethanolamine; in a particularly preferred embodiment it is glycerol. Preferred in particular is a first polyether polyol ii.1) that has a molecular weight of 6000-10 000 g/mol or 6000-8000 g/mol, more preferably of 6000-7000 g/mol, even more preferably of 6000-6500 g/mol, most preferably of 6100-6300 g/mol.

The polyester polyols are generally produced in the manner known to those skilled in the art by polycondensation of acid with diols and triols. Instead of or in addition to the acid, use may of course also be made of acid derivatives, such as acid anhydrides and/or acid alkyl esters. Polycondensation is normally effected in bulk, i.e. without solvent. It may alternatively be effected in the presence of a solvent. A catalyst may be used to accelerate the polycondensation. The reaction may also be accelerated by application of reduced pressure. It may alternatively be carried out at atmospheric pressure, with an inert gas, for example nitrogen, then preferably being used to discharge the resultant water of reaction or the alkyl alcohols, particularly toward the end of the polycondensation.

The polyester polyol ii.2) according to the invention is based on the condensation of adipic acid with 1,2-propylene glycol and at least one further compound having at least two hydroxyl groups, and has a functionality of greater than 2 and a hydroxyl number of 60-150 mg KOH/g.

The hydroxyl number of the polyester polyol ii.2) is adjusted by appropriately selecting the molar ratio of hydroxyl groups from 1,2-propylene glycol and the at least one further compound having at least two hydroxyl groups to the carboxyl groups of adipic acid or the carboxyl group equivalents when adipic acid derivatives are used. The functionality of the polyester polyol ii.2) is adjusted by the respective proportion of polyols. By way of example, when using 1,2-propylene glycol and 1,1,1-trimethylolpropane (TMP) in a one-molar batch (the amount of the polyester polyol in the batch after removal of the cleavage products water or, where appropriate, alkyl alcohol corresponds to the number-average molar mass), the functionality F of the polyester polyol ii.2) is calculated from the molar amount of TMP used according to the formula: F=2+moles of TMP.

The OH number (OHN, hydroxyl number) is a measure of the content of hydroxyl groups in the respective polyol or the polyol mixture. The OHN indicates the amount of potassium hydroxide in milligrams which is equivalent to the amount of acetic acid bound by one gram of polyol during the acetylation.

In the context of this application, the functionality is the theoretical functionality, based on the number of active hydrogens in the starter molecules from which the polyether or polyester polyols are produced. For each individual polyol, the theoretical functionality is thus an integer. Mixtures of such polyols, for example made of a mixture of polyols generated from di- or trifunctional starters, may have a theoretical functionality lying between the functionalities of the starters. By way of example, a mixture of polyols produced from an equimolar mixture of ethylene glycol and glycerol has a theoretical functionality of 2.5.

Commonly known (cyclo)aliphatic and/or in particular aromatic polyisocyanates may be used as polyisocyanates of the isocyanate component i. Particularly suitable for producing the composite elements according to the invention are aromatic diisocyanates, preferably diphenylmethane diisocyanate (MDI) and toluene diisocyanate (TDI), very particularly preferably MDI. The isocyanates may be used in the form of the pure compound or in modified form, for example in the form of uretdiones, isocyanurates, allophanates or biurets, preferably in the form of urethane group- and isocyanate group-containing reaction products, what are known as isocyanate prepolymers.

The known prepolymer process involves, in a first step, the production of the isocyanate component i. from a polyisocyanate P and a deficit amount, based on the functional NCO groups, of a polyether polyol PEP. The prepolymer i. as isocyanate component is then reacted with the other components ii.1), ii.2), ii.3) and ii.4) and optionally ii.5), ii.6), ii.7), ii.8) and/or ii.9) to form the desired product B. Preferably, the polyisocyanate P is a diphenylmethane diisocyanate mixture having an NCO content of 26 to 33.6% by weight of NCO, containing isomers of monomeric MDI and higher MDI homologs, and the polyether polyol PEP is a polyether (polypropylene oxide having an OH number of 29 mg KOH/g and a nominal functionality of 6) having an NCO content of 26% by weight and a content of monomeric MDI of 55-63% by weight.

To produce the composite elements according to the invention, the polyisocyanates of the isocyanate component i. and the isocyanate-reactive component ii. can be reacted in amounts such that the equivalence ratio of NCO groups from i. to the sum total of the reactive hydrogen atoms from ii. is preferably 0.3:1 to 1.8:1, particularly preferably 0.8:1 to 1.5:1 and in particular 0.9:1 to 1.2:1.

The reaction to give the product may, for example, be carried out by means of manual casting, by means of high-pressure or low-pressure machines or by means of RIM processes (reaction injection molding) usually in open or preferably closed molding tools. Suitable processing machines are commercially available (for example from the companies Isotherm, Hennecke, Krauss Maffei, etc.).

Components i. and ii. are usually mixed, depending on the particular application, at a temperature of 10 to 100° C., preferably of 20 to 60° C., and for example introduced into the molding tool. The mixing may be carried out on a laboratory scale for example by means of a Pendraulik stirrer or be effected on a larger scale using customary high-pressure mixing heads.

The reaction of the reaction mixture may for example be carried out in customary, preferably temperature-controllable and closable molds. In particular when producing products with maximum smoothness, the molding tools used are preferably those whose surface has maximum smoothness or defined ornamentation and preferably has no unevennesses, cracks, scratches or contamination. The surface of these molds may for example be pretreated by polishing.

Used as molding tools for producing the composite elements may be customary and commercially available tools whose surface is for example made of steel, aluminum, enamel, Teflon, epoxy resin or another polymeric material, where the surface may optionally have been chromium-plated, for example hard chromium-plated. Preferably the molding tools should be temperature-controllable, so as to be able to set the preferred temperatures, should be closable and should be of a design that is appropriate for exerting a pressure on the product. If the molding tool is under pressure, the pressure is normally reduced (for example by preliminary unlocking and/or by targeted ventilation) before the mold is opened.

The reaction to give the polyisocyanate polyaddition products is usually effected at a molding temperature of 20 to 220° C., preferably of 20 to 120° C., particularly preferably of 20 to 60° C. The reaction of the reaction mixture in the molding tool is effected according to the invention in direct contact with the thermoplastic A. This may for example be achieved by, before the reaction, placing A., if A. is a film, preferably free of folds, into the mold and then filling the mold with the reaction mixture and preferably subsequently closing the mold. It is also known to first place the film A. and optionally other components into the mold, subsequently close the mold and then mix the liquid starting components and inject them into the closed mold.

In addition to the first polyether polyol ii.1) used according to the invention, further, commonly known polyether polyols may be used as component ii.5). Said polyether polyols usually have molecular weights of 300 to 15 000 g/mol, in particular of 320 to 13 000 g/mol, and preferably a functionality of 2 to 6. These may also be copolymers, for example polyether polyols with a styrene-acrylonitrile copolymer (SAN) fraction. In a preferred form, component ii.5) is a glycerol-started polyether polyol with 80% by weight of propylene oxide and 20% by weight of ethylene oxide end block having a solids content of approx. 42% by weight of styrene-acrylonitrile copolymer and a hydroxyl number of approx. 20 mg KOH/g.

The commonly known chain extenders and/or crosslinking agents may be used as component ii.6).

These may for example be selected from the group consisting of diethanolamine, triethanolamine, glycerol, 1,2-ethanediol, isosorbide and mixtures thereof.

Customary compounds that for example accelerate the reaction of component i. with further constituents of component ii., in particular ii.1), ii.2), ii.3), ii.4) and optionally ii.5) and/or ii.6), may be used as catalysts ii.7). Suitable examples include tertiary amines and/or organometallic compounds, in particular tin compounds. The catalysts used are preferably those that lead to minimum fogging, i.e. minimum emission of volatile compounds from the reaction product B., for example potassium acetate and/or Li salts and/or tertiary amines having at least one functional hydroxyl group.

Commonly known chemically or physically acting compounds may be used as blowing agents ii.8) for producing foamed products B., for example flexible, semi-rigid or rigid polyurethane foams, that may optionally have urea and/or isocyanurate structures. Water can preferably be used as chemically acting blowing agent, said water forming carbon dioxide by reaction with the isocyanate groups. Examples of physical blowing agents, i.e. those inert compounds that evaporate under the conditions of the polyurethane formation, are for example (cyclo)aliphatic hydrocarbons, preferably those having 4 to 8, particularly preferably 4 to 6 and in particular 5, carbon atoms, partially halogenated hydrocarbons or ethers, ketones or acetates. Use may alternatively be made of carbon dioxide ($CO_2$), which for example is added to at least one of component i. or a constituent of component ii. up to the limit of its chemical-physical solubility. The amount of blowing agents used is guided by the target density of the foams. The various blowing agents may be used individually or in any desired mixtures with one another.

The reaction is optionally effected in the presence of auxiliaries and/or additives ii.9), such as fillers, fibers, for example in the form of woven fabrics and/or mats, cell regulators, surface-active compounds and/or stabilizers against oxidative, thermal or microbial degradation or aging.

The use of the first polyether polyol ii.1) means that the composite elements according to the invention in particular have significantly improved adhesion between A. and B. The adhesion to A. is particularly good if plasticized PVC is used. What is achieved by the use of the first polyether polyol ii.1) according to the invention is that the adhesion between A. and B., when measuring in accordance with DIN 53357-A, achieves values of at least 26 N/50 mm, preferably at least 27 N/50 mm, more preferably at least 29 N/50 mm. The force was standardized in accordance with DIN 53357-A to one unit width of the foam strips of 50 mm in order to improve comparability of the measurements. For the purposes of this application, samples with a width of 50 mm were produced and investigated.

The invention shall be explained in more detail on the basis of the examples that follow.

EXAMPLES

Measuring Instruments and Standards Used:
Determination of the hydroxyl number in accordance with DIN EN ISO 53240-2: Method with catalyst, November 2007 version
Determination of the NCO content (Plastics—Polyurethane raw materials)—in accordance with DIN EN ISO 14896 of 2009
Determination of the foam density in accordance with DIN 53420
Determination of the separation force
The testing is carried out in accordance with the separation test according to DIN 53357. For this purpose, test specimens with a length of 170 mm and a width of 50 mm were produced. Testing velocity: 50 mm/min (the force is determined in accordance with DIN 53357 A; said force per composite element width represents the adhesion (rolling peel resistance)).

The values reported in Table 1 are reported in parts by weight, unless stated otherwise.

The materials and abbreviations used have the following meanings:
PET A: Glycerol-started polyether polyol with 87% by weight of propylene oxide and 13% by weight of ethylene oxide end block having an OH number of 35 mg KOH/g and a nominal functionality of 3
PET B: Glycerol-started polyether polyol with 78% by weight of propylene oxide and 22% by weight of ethylene oxide end block having an OH number of 27.5 mg KOH/g and a nominal functionality of 3
PET C: Glycerol-started polyether polyol with 83% by weight of propylene oxide and 19% by weight of ethylene oxide end block having an OH number of 35 mg KOH/g and a nominal functionality of 3
PET D: Ethylenediamine-started polyether polyol with 100% by weight of propylene oxide, an OH number of 630 mg KOH/g and a nominal functionality of 4
SAN polyol: Glycerol-started polyether polyol with 80% by weight of propylene oxide and 20% by weight of ethylene oxide end block and a nominal functionality of 3 having a solids content of approx. 42% by weight of styrene-acrylonitrile copolymer and a hydroxyl number of approx. 20 mg KOH/g, from Covestro Deutschland AG
Polyester polyol: Polyester polyol based on trimethylolpropane, 1,6-hexanediol, 1,2-propanediol and adipic acid having an OH number of 109 mg KOH/g and a nominal functionality of 3.23
Carbon black: ISOPUR® N black paste, from ISL-Chemie
Chain extender 1: 1,4-Butanediol
Chain extender 2: Diethyltoluenediamine
Chain extender 3: Diethanolamine
Stabilizer: TEGOSTAB® B8734 LF2, from Evonik, silicone-based
Catalyst 1: N,N,N'-Trimethyl-N'-hydroxyethyl-bis(aminoethyl) ether, from Huntsman
Catalyst 2: N[3-(Dimethylamino)propyl]urea, from Evonik
Catalyst 3: Mixture of approx. 95% by weight of 6-dimethylaminohexanol and approx. 5% by weight of N-[2-[2-(dimethylamino)ethoxy]ethyl]-N-methyl-1,3-propanediamine, from Evonik
Isocyanate A: Diphenylmethane diisocyanate mixture having an NCO content of 32% by weight of NCO, comprising 0.05-0.5% by weight of 2,2'-MDI, 5.5-7.5% by weight of 2,4'-MDI, 50-54% by weight of 4,4'-MDI and higher MDI homologs, from Covestro Deutschland AG
Isocyanate B: Polyisocyanate based on diphenylmethane diisocyanate and a sorbitol-started polyether (polypropylene oxide having an OH number of 29 mg KOH/g and a nominal functionality of 6) having an NCO content of 26% by weight and a monomeric MDI content of 55-63% by weight, from Covestro Deutschland AG.

The film used was a skin produced by the slush process and based on DSY 260/02 PVC powder from Nakan.

TABLE 1

| Parameter | Example 1 | Comparative example 2 | Comparative example 3 |
|---|---|---|---|
| PET A | 0.0 | 75.01 | 30 |
| PET B | 73.6 | 0 | 0 |
| PET C | 0 | 0 | 50.4 |
| PET D | 0 | 0 | 2 |
| SAN polyol | 14.9 | 15 | 3.35 |
| Polyester polyol | 5 | 5 | 5 |
| Water | 2.6 | 2.6 | 2.1 |
| Chain extender 2 | 1.4 | 0.5 | 0.95 |
| Chain extender 1 | 0.9 | 0 | 0 |
| Carbon black | 0.5 | 0.5 | 0.5 |
| Chain extender 3 | 0.0 | 0.23 | 0 |
| Stabilizer | 0 | 0.1 | 0 |
| Catalyst 3 | 0.8 | 0.8 | 0 |
| Catalyst 2 | 0 | 0 | 0.9 |
| Catalyst 1 | 0.3 | 0.3 | 0.2 |
| Isocyanate A | 0 | 0 | 42.6 |
| Isocyanate B | 68.8 | 66.5 | 0 |
| Separation force between foam and PVC after 24 h [N/50 mm] | 30 | 25 | 15 |
| Foam density [kg/m$^3$] | 125 | 130 | 150 |

Production of the Composite Elements

The composite elements were produced at a molding temperature of 45° C. in an aluminum mold with dimensions of 200×200×10 mm$^3$ which was lined with a Teflon film and could be closed with a cover. A PVC film (200×200×1.1 mm$^3$) was placed on the bottom of the mold. The constituents of the isocyanate-reactive component were first mixed in a 200 l drum with a stirrer for approx. 1 h, with the result that 150 kg of a homogeneous polyol formulation (isocyanate-reactive component) was present. The high-pressure system was then filled with both components (isocyanate-reactive component and isocyanate component) and the temperature was set at 30° C. in each case.

Subsequently both components were mixed at a component pressure of 150 bar using a high-pressure mixing head. The reaction mixture resulting therefrom was applied to the open mold, and the latter was closed, with the amount of reaction mixture being chosen so as to result in an average density of the foam of 120 kg/m$^3$. Demolding was performed after approx. 10 minutes and the composite element was stored at room temperature for 24 hours. Strips with a width of 50 mm were subsequently cut out. These strips were tested with respect to their adhesion properties (adhesion between PVC film and polyurethane).

It became clear from the experiments that the composite elements according to the invention with the polyether polyol according to the invention have significantly higher adhesion between thermoplastic and the polyisocyanate polyaddition product than the composite elements not according to the invention.

The invention claimed is:

1. A composite element comprising
a thermoplastic adjoined in adhering fashion by a product of the reaction of a reaction mixture comprising:
 i. an isocyanate component comprising one or more polyisocyanates, and
 ii. an isocyanate-reactive component comprising:
  ii.1) a first polyether polyol having a molecular weight of at least 6000 g/mol that is a reaction product of a starter molecule or a mixture of starter molecules having an OH functionality of 1.8-3.5 with ethylene oxide and propylene oxide, wherein the proportion of ethylene oxide, based on the total amount of ethylene oxide and propylene oxide, in the first polyether polyol is 10-28% by weight,
  ii.2) one or more polyester polyols having a functionality of greater than 2 and a hydroxyl number of 60-150 mg KOH/g, and that is a condensation reaction product of adipic acid with 1,2-propylene glycol and at least one further compound having at least two hydroxyl groups,
  ii.3) 1,4-butanediol,
  ii.4) diethylenetoluenediamine,
  ii.5) optionally further polyether polyols,
  ii.6) optionally chain extenders and/or crosslinking agents,
  ii.7) optionally catalysts,
  ii.8) optionally blowing agents, and
  ii.9) optionally auxiliaries and/or additives.

2. The composite element as claimed in claim 1, wherein the product of the reaction of the reaction mixture has a foam density of 155 kg/m3 or less, determined in accordance with DIN 53420.

3. The composite element as claimed in claim 1, wherein the proportion of ii.1) is 50-90% by weight and/or the proportion of ii.2) is 0.1-10% by weight and/or the proportion of ii.3) is 0.1-2.0% by weight and/or the proportion of ii.4) is 0.01-2.0% by weight, in each case based on the total amount of isocyanate-reactive component ii.

4. The composite element as claimed in claim 1, wherein the first polyether polyol ii.1) has a molecular weight of 6000-10 000 g/mol.

5. The composite element as claimed in claim 1, wherein, for the first polyether polyol ii.1), the proportion of ethylene oxide, based on the total amount of ethylene oxide and propylene oxide, is 15-25% by weight.

6. The composite element as claimed in claim 1, wherein, for the first polyether polyol ii.1), the starter molecule comprises ethylene glycol, 1,2-propylene glycol, 1,3-propylene glycol, 1,4-butanediol, 4,4'-dihydroxydiphenylpropane, glycerol, trimethylolpropane, erythritol, sorbitol, ammonia, ethylene diamine, aniline, ethanolamine and triethanolamine, or a mixture thereof.

7. The composite element as claimed in claim 1, wherein, for the one or more polyester polyols ii.2), the at least one further compound having at least two hydroxyl groups is comprises ethylene glycol, 1,3-propylene glycol, 1,4-butanediol, 1,5-pentanediol, 1,6-hexanediol, trimethylolpropane, or a mixture thereof.

8. The composite element as claimed in claim 1, wherein, for the one or more polyester polyols ii.2), the at least one further compound having at least two hydroxyl groups consists of 1,6-hexanediol and trimethylolpropane.

9. The composite element as claimed in claim 1, wherein the thermoplastic comprises acrylonitrile-butadiene-styrene (ABS), polymethyl methacrylate (PMMA), acrylonitrile-styrene-acrylate (ASA), styrene-acrylonitrile (SAN), polycarbonate (PC), thermoplastic polyurethane (TPU), polyvinyl chloride (PVC), thermoplastic polyolefins (TPO) (optionally post-crosslinked), styrene-maleic anhydride copolymer (SMA), or a blend thereof.

10. The composite element as claimed in claim 1, wherein the adhesion between the thermoplastic and the product of the reaction of the reaction mixture is at least 26 N/50 mm, measured in accordance with DIN 53 357 A as disclosed in the description.

11. A process for producing a composite element as claimed in claim 1, comprising:
 I. providing the thermoplastic, the isocyanate component, and the isocyanate-reactive component,
 II. mixing the isocyanate component and the isocyanate-reactive component provided in step I. in order to obtain the reaction mixture,
 III. bringing the reaction mixture obtained in step II. into contact with the thermoplastic provided in step I. so that the reaction mixture is in contact with the thermoplastic,
 IV. foaming the reaction mixture obtained in step II. while it is in contact with the thermoplastic, in order to obtain a composite element comprising the thermoplastic adjoined in adhering fashion by the product of the reaction of the reaction mixture, and
 V. demolding the composite element obtained in step IV.

12. A component in a vehicle construction, an aircraft construction, or a building construction comprising the composite element as claimed in claim 1.

* * * * *